Figure 1:
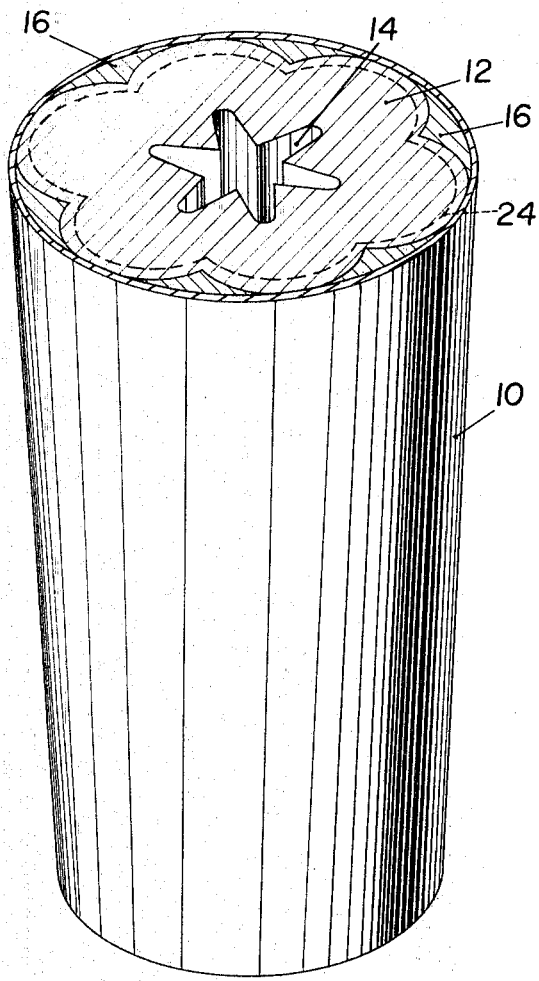

Jan. 10, 1967  D. L. NASH  3,296,794

ROCKET MOTOR

Filed March 9, 1965

INVENTOR.
David L. Nash
BY
Edwin D. Grant
ATTORNEY

United States Patent Office 3,296,794
Patented Jan. 10, 1967

3,296,794
ROCKET MOTOR
David Lewis Nash, Bountiful, Utah, assignor to Thiokol Chemical Corporation, Bristol, Pa., a corporation of Delaware
Filed Mar. 9, 1965, Ser. No. 438,189
5 Claims. (Cl. 60—39.47)

This invention relates to solid propellant rocket motors and more particularly to improved solid propellant rocket motors having means which provide relatively constant rates of combustion of the solid propellant in their terminal stages.

In the art of solid propellant rocketry, monopropellant charges having noncylindrical star-shaped internal cavities are commonly cast in cylindrical motor cases. Since such a charge burns at the surface of its internal cavity outwardly toward the motor case (more specifically, in a direction normal to all surfaces of the internal cavity of the charge), its flame front reaches some portions of the cylindrical case wall before others. This uneven "burn-out" results in formations of propellant, present in a rocket motor at the end of its firing period, which are longitudinally oriented along the wall of the motor case and which, because of their general shape, are known in the art as "slivers." Obviously the surface of such slivers exposed to burning before the charge is completely consumed is considerably less than the surface of propellant exposed to burning prior to the time the flame front reaches the case wall, and also this sliver surface continuously decreases with time. Consequently, this reduced burning surface of the propellant at the end of the firing period of the rocket motor results in a period of thrust decay (i.e., a period of gradually diminishing thrust) instead of the abrupt "cutoff" thrust termination that is desirable from the standpoint of optimal performance of a rocket motor.

Heretofore strips of an inert material have been placed around the interior case walls of solid propellant rocket motors at points thereon where it has been found that the aforementioned slivers of propellant would normally form as a result of uneven burning of the charge in a radial direction. The cross-sections of such inert slivers have been designed so that the flame front of the burning charge reaches all portions of the cylindrical case wall at approximately the same time it reaches the surfaces of the slivers adjacent the propellant core, thus providing for abrupt termination of the thrust produced by the rocket motor. It will be obvious, however, that the weight of such inert slivers, which contributes nothing to thrust, adversely affects the payload which can be handled by a rocket motor of any given motor case size.

It is therefore a broad object of this invention to provide an improved rocket motor having means which provide a relatively constant rate of combustion of the solid propellant of the motor at the end of its firing period without adversely affecting the usable weight thereof. In accordance with the principles of this invention, this object, as well as other objects hereinafter stated, is achieved by a preferred embodiment of the invention comprising: a cylindrical motor case; a perforated combustible charge of solid propellant fixedly disposed within said motor case; and a plurality of combustible slivers of solid propellant each having a first surface which is bonded to the interior surface of the wall of said motor case, and second and third surfaces which are disposed adjacent said charge, and which project toward the center thereof, each of said slivers including means for maintaining the surface area thereof exposed to combustion relatively constant throughout its burning period.

It is another object of this invention to provide an improved rocket motor having combustible slivers the surface area of which remains constant when undergoing combustion.

It is an additional object of this invention to provide an improved rocket motor which possesses a relatively constant thrust near the end of its firing period.

It is a further object of this invention to provide an improved rocket motor the thrust of which terminates abruptly.

Figure 2:
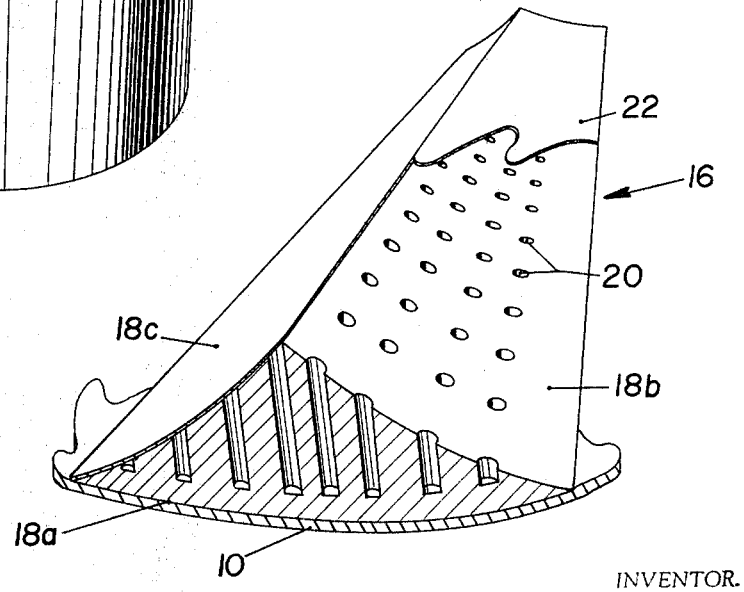

Various other objects and advantages of the invention will become manifest in the following description of a preferred embodiment thereof, considered in conjunction with the accompanying drawings wherein:

FIGURE 1 is a pictorial view illustrating a section of a rocket motor constituting a preferred embodiment of the invention; and FIGURE 2 is a fragmentary detail view illustrating a typical one of a plurality of combustible slivers utilized as components of the embodiment of the invention illustrated in FIGURE 1, together with a portion of the wall of the motor case of said embodiment.

Throughout the specification and drawings, like reference numerals designate like parts.

In the embodiment of this invention illustrated in FIGURE 1, the rocket motor includes a motor case 10 in which is fixedly disposed a perforated combustible charge 12. The centrally-located cavity 14 of the charge 12 is provided with six recesses each of which extends in a direction generally radial to the axis of the charge. However, as will be understood by persons skilled in the art of solid propellant rocketry, many different designs for the central cavity of a combustible charge are utilized, and the illustrated design is for the purpose of example only. Six combustible slivers, generally designated by the numeral 16, are fixedly attached, as by means of a chemical bonding agent, to the interior surface of the motor case 10. As can be seen in FIGURE 2, which illustrates in detail a typical one of the slivers 16, each of said slivers is generally triangular in cross-section; more particularly, each of the slivers 16 includes three surfaces, which for the sake of convenience will be referred to hereinafter as its first surface 18a, second surface and third surface 18c, with the first surface 18a being curved outwardly and the second surface 18b and third surface 18c being curved inwardly. Each of the slivers 16 is coextensive with the charge 12 and attached at its first surface 18a to the motor case 10 at one of the positions where slivers of solid propellant are formed in rocket motors which are of conventional design and which utilizes a star-shaped or irregularly recessed internal cavity. In the illustrated preferred embodiment of the invention, the slivers 16 are longitudinally oriented on the wall of the motor case 10 at positions respectively radially aligned with the innermost edges of the walls of the internal cavity 14.

As can be seen in FIGURE 2, a plurality of holes 20 respectively extend from the second surface 18b and third surface 18c of each sliver 16 to a point adjacent (which is to be understood in reference to the holes 20 as meaning near but not in contact with) the motor case 10, these holes being disposed in parallel relation to one another and arranged in longitudinal and transverse rows as illustrated. A thin sheet 22, made of plastic or other combustible material such as cured solid propellant, is disposed between each sliver 16 and the adjacent portion of charge 12.

The slivers 16 are precast in a mold to the desired cross-section and length, and the first surface 18a of each sliver is then bonded to the motor case 10 at one of the positions where propellant slivers are formed in rocket motors of conventional design. The sheet 22 is next placed adjacent the second surface 18b and third surface 18c of each sliver 16, covering the holes 20, and the charge 12 is thereafter cast within the motor case 10 in accordance with standard methods.

It will be apparent that the motor case 10 may be formed of a great variety of materials well known in the art, and furthermore that the charge 12 and slivers 16 may also comprise many kinds of solid propellants. In the preferred embodiment of the invention herein described, the composition of the slivers 16 is the same as that of the charge 12, but in some rocket motors it may be advantageous to employ different propellants for the charge and the slivers.

As mentioned hereinbefore, burning of a combustible charge having an internal cavity of star-shaped configuration occurs in such a manner that the flame front reaches the wall of the motor case at certain points thereon before it reaches others. This phenomenon of the burning of such a combustible charge will readily be appreciated by reference to FIGURE 1 wherein the broken line 24 represents the contours of the internal cavity of the charge 12 as they would appear near the end of the firing period of the rocket motor. It can also be seen in the drawing that the surfaces 18b and 18c of each sliver 16 project in a gradual curve toward the center of the charge 12 so that the flame front reaches said surfaces at substantially the same time it reaches the wall of the motor case 10. At this time the sheet 22 is burned and the surfaces of the slivers 16 are ignited. Because the flame subsequently flashes into each of the holes 20, burning also precedes normal to the walls of said holes. Thus, as the total area of the surfaces 18b and 18c of the slivers 16 decreases, the area within the holes 20 which is exposed to burning increases. Consequently, the rate of combustion of the slivers 16 remains relatively constant until they are completely consumed, with the advantageous result that the thrust of the rocket motor near the end of its firing period also remains relatively constant.

Persons skilled in the art of solid propellant rocketry will recognize that many modifications may be made in the construction and design of the embodiment illustrated in FIGURES 1 and 2 without, however, departing from the principles of this invention. For example, where the design of the internal cavity of a charge differs from that illustrated in FIGURE 1, the portion of each sliver 16 adjacent the charge may be formed in a curved, continuous surface, in which case there will be no sharp edge at the innermost portion of the sliver as in the preferred embodiment of the invention illustrated in the drawings. In such designs of the slivers 16, there will be in actuality only a single continuous surface adjacent the charge of the rocket motor. With proper design of their size and contour, the slivers 16 can be made to burn out at exactly the same time as the remainder of the charge 12. The holes 20 may vary in depth, diameter, spacing and angular relationship with respect to the sliver surfaces.

Therefore, although the invention has been described and illustrated in detail, it is to be clearly understood that the same is by way of illustration and example only and is not to be taken by way of limitation, the scope of the invention being limited only by the terms of the appended claims.

What is claimed is:
1. A solid propellant rocket motor comprising:
   a motor case;
   an internal burning combustible charge disposed within said motor case; said charge being formed with a cavity comprising a plurality of circumferentially spaced, longitudinally extending recesses; and
   a plurality of combustible slivers each having at least one surface which is disposed adjacent said charge and a second surface adjacent said motor case, each sliver including a plurality of holes which respectively extend from said first mentioned surface to a point adjacent said motor case.
2. A solid propellant rocket motor as defined in claim 1 including a combustible sheet disposed between each of said slivers and said charge.
3. A solid propellant rocket motor as defined in claim 2 wherein said sheet comprises cured solid propellant.
4. A solid propellant rocket motor comprising:
   a motor case;
   an internal burning combustible charge disposed within said motor case; said charge being formed with a cavity comprising a plurality of circumferentially spaced, longitudinally extending recesses and
   a plurality of combustible slivers each having a first surface disposed adjacent the interior surface of said motor case and a second surface which is disposed adjacent said charge and which projects toward the center thereof, each of said slivers including a plurality of holes which respectively extend from said second surface to a point adjacent said motor case.
5. A solid propellant rocket motor as defined in claim 4 wherein:
   each of said slivers includes a third surface which is disposed adjacent said charge and which projects toward the center thereof; and
   each of said slivers includes a plurality of holes which respectively extend from said third surface to a point adjacent said motor case.

References Cited by the Examiner
UNITED STATES PATENTS

| | | | |
|---|---|---|---|
| 677,528 | 7/1901 | Maxin | 102—98 |
| 3,144,829 | 8/1964 | Fox | 60—35.6 X |

CARLTON R. CROYLE, *Primary Examiner.*

MARK NEWMAN, *Examiner.*